(12) United States Patent
Rooks et al.

(10) Patent No.: US 7,231,354 B1
(45) Date of Patent: Jun. 12, 2007

(54) METHOD, APPARATUS, AND COMPUTER-READABLE MEDIUM FOR ADMINISTERING THE IMPLEMENTATION OF PRODUCT CHANGE NOTICES

(75) Inventors: Monica L. Rooks, Suwanee, GA (US); Archie C. McCain, Lawrenceville, GA (US); Calvin Watson, Hendersonville, NC (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 939 days.

(21) Appl. No.: 10/293,052

(22) Filed: Nov. 12, 2002

(51) Int. Cl.
*G06Q 00/99* (2006.01)

(52) U.S. Cl. .................. 705/1; 705/7; 705/10; 705/28; 705/26; 717/100; 707/10

(58) Field of Classification Search .................. 705/1, 705/7, 10, 14, 26, 28; 707/10; 700/105; 370/254
See application file for complete search history.

(56) References Cited

U.S. PATENT DOCUMENTS

| | | | | |
|---|---|---|---|---|
| 5,860,007 | A * | 1/1999 | Soni et al. | 717/121 |
| 5,870,745 | A * | 2/1999 | McCune | 707/10 |
| 6,338,149 | B1 * | 1/2002 | Ciccone et al. | 714/38 |
| 6,411,681 | B1 * | 6/2002 | Nolting et al. | 379/1.01 |
| 6,721,746 | B2 * | 4/2004 | Zulpa et al. | 707/10 |
| 6,804,785 | B2 * | 10/2004 | Steele et al. | 726/4 |
| 7,031,787 | B2 * | 4/2006 | Kalthoff et al. | 700/105 |
| 7,051,036 | B2 * | 5/2006 | Rosnow et al. | 707/102 |
| 2001/0033550 | A1 * | 10/2001 | Banwell et al. | 370/254 |
| 2003/0074346 | A1 * | 4/2003 | Ueda et al. | 707/1 |
| 2003/0106039 | A1 * | 6/2003 | Rosnow et al. | 717/100 |

FOREIGN PATENT DOCUMENTS

EP 323382 A2 * 7/1989

OTHER PUBLICATIONS

"Total Parts Plus Launches Electronics Component Database Enhancement Services", May 2, 2001, Business wire, p. 2688, 2 pgs.*
"Pacific Bell and Andersen Consulting Team to Remarket PACE Solution for Plug-In Inventory Control", Oct. 2, 1995, Business Wire, 9100021135, 2 pgs.*
Jackson, Lynne, "Remote Testing Within Reach", Jan. 6, 1998, InternetWeek, p. S3, 6 pgs.*

* cited by examiner

*Primary Examiner*—John W. Hayes
*Assistant Examiner*—Freda A Nelson
(74) *Attorney, Agent, or Firm*—Merchant & Gould (57) ABSTRACT

A method, apparatus, and computer-readable medium for administering the implementation of product change notices (PCN). A PCN database application server computer is utilized to provide a method for implementing a change to telecommunications products. The method includes the steps of receiving a PCN that identifies the change, determining whether the PCN satisfies the implementation requirements, and if the PCN does satisfy these requirements, implementing the change. Once the PCN is received, it is monitored for conformance to an implementation schedule and updated for progress until completion. Updates may be received from remote inventory systems or suppliers. Upon completion or rejection of the PCN, the PCN is closed.

28 Claims, 10 Drawing Sheets

| Supplier's Company Name (30 char) 60A | Supplier's Address (30 char) 60B | Supplier's City (30 char) 60C |
|---|---|---|
| Supplier's State (2 char) 60D | Supplier's Zip (10 char) 60E | Supplier's Technical Contact Name (20 char) 60F |
| Supplier's Technical Contact Phone Number (12 char) 60G | Bellcore Vendor Abbreviation (4 char) 60H | Product Change Notice Number (25 char) 60I |
| Product Change Notice Issue Number (3 char) 60J | Vendor's Change Identification Number (20 char) 60K | Supplier's Change Procedure (20 char) 60L |
| PCN Issue Date (10 char) 60M | Major System Affected (6 char) 60N | Sub System Affected (72 char) 60O |
| Hardware Affected (1 char) 60P | Firmware Affected (1 char) 60Q | Software Affected (1 char) 60R |
| Plug-In Affected (1 char) 60S | New Product Code (30 char) 60T | New Firmware Code (30 char) 60U |
| Old Product Code (30 char) 60V | Old Firmware Code (30 char) 60W | New CLEI Code (10 char) 60X |
| Old CLEI Code (10 char) 60Y | Associated Products (72 char) 60Z | |
| Drawing Number (72 char) 60AA | | Reference Drawing Number (72 char) 60BB |
| Classification of Change (2 char) 60CC | Reason for Classification (72 char) 60DD | |

| | |
|---|---|
| Vacant | 60EE |
| Reason for Change (72 char) | |
| | 60FF |
| Description of Change (72 char) | |
| | 60GG |

| | |
|---|---|
| Change Verification Procedures (72 char) 60HH | Safety Notice (1 char) 60II |
| Fire Notice (1 char) 60JJ | Service Affecting (1 char) 60KK | Transmission Affecting (1 char) 60LL |
| Maintenance Affecting (1 char) 60MM | Reliability Affecting (1 char) 60NN | Power Affecting (1 char) 60OO |
| Traffic Affecting (1 char) 60PP | Describe the effect of change (72 char) 60QQ |
| Material Affected (72 char) 60RR | Documentation Affected (72 char) 60SS |
| Implementation Date (10 char) 60TT | Modification Completion Date (10 char) 60UU |
| Modification Location (72 char) 60VV | (F)ield(L)ab Trial or (N)/A (1 char) 60WW |
| Estimated Installation Time per Product Code (15 char) 60XX | Modification Cost (15 char) 60YY | Title of Supplier's Location/Quantity Report (15 char) 60ZZ |
| Attachments (72 char) 60AAA |
| Comments (72 char) 60BBB |

METHOD, APPARATUS, AND COMPUTER-READABLE MEDIUM FOR ADMINISTERING THE IMPLEMENTATION OF PRODUCT CHANGE NOTICES

TECHNICAL FIELD

The present invention generally relates to computerized databases. More specifically, the present invention relates to systems for administering the implementation of product change notices identifying changes to telecommunications products.

BACKGROUND OF THE INVENTION

The telecommunications industry serves millions of customers with an important service that customers have come to depend on as an integral part of their lives. Telecommunications services are made possible by a vast network of products distributed across a large geographic area. It is imperative that changes to these products are accurately reported and tracked to completion according to the needs and requirements of the customer and the government. To stay current with advances in technology, maintain quality of service with minimal interruptions, and meet Federal Communications Commission (FCC) regulations regarding repair of defects in a timely manner, companies within the telecommunications industry must work with their suppliers to review and make implementation decisions on a voluminous quantity of product change notices in an organized and efficient manner. A product change notice (PCN) is a notification of change to a product that may be cosmetic, correct product flaws, or introduce new features. PCNs include any changes that affect form, fit, function, or the technical specification of the product.

As a result of the need to administer the implementation of PCNs in a timely manner, many industry members have mainframe-based systems to initiate and track PCNs. For example, in previous systems, suppliers generate a hardcopy PCN and provide the PCN to each company using their equipment. Company personnel then manually enter the PCN data into the mainframe. However, these systems provide only limited organizational functions to the users that are responsible for monitoring and implementing PCNs. For example, these previous systems require manual data entry of the PCN indexing data and show only that a PCN exists. However, the actual PCNs are not entered into previous systems and are entirely paper-based. Consequently, previous logging systems like these suffer from a number of drawbacks that render them inefficient.

One drawback is the large amount of time and large number of people required to evaluate, approve, and release a PCN for implementation using previous systems. Company evaluators review PCNs before approval, including evaluating the PCN details along with its indexing information. Indexing information is PCN header data that includes the PCN number, a brief description, and other key points of information to help locate the actual PCN. Although the company evaluators have initial notice that they need to evaluate a PCN, the actual hardcopy PCN is not delivered to evaluators until later by mail. Because the actual PCN details cannot be evaluated until the paper copy arrives by mail, there can be a significant delay between notification and approval of the PCN. Such delays can cause delays in repairing equipment, thereby causing monetary penalties for companies due to FCC regulations and strained relations with local Public Service Commissions and customers.

Secondly, because of the large volume of PCNs generated by suppliers, previous systems necessitated extensive labor-intensive activity requiring a large numbers of employees to manually input indexing data and process and file the paper copies.

Furthermore, with previous systems, technicians that are troubleshooting problems within a telecommunications network cannot readily obtain historical data on changes made to the network on which they are troubleshooting. For example, using previous systems, a technician cannot easily obtain information regarding whether a PCN has already been applied to a network element. This type of information is essential in reducing the amount of time required to solve equipment problems.

Another drawback of previous systems stems from the fact that notice of the PCNs is not proactively shared with entities affected by the change. For example, obsolete products may be erroneously cycled through the repair process simply because inventory personnel are not informed of PCNs. Further, efficiency is compromised when technicians make needless repair dispatches due to the inability of obtaining timely and proactive notification of a PCN. Suppliers are also not notified when PCNs they send are received and they are left wondering if their notices have been accepted and approved. As a result, more delay is introduced because suppliers cannot begin implementing the change until they receive notice of approval from the company.

Therefore, in light of the above, there is a need for a method, apparatus, and computer-readable medium for administering the implementation of PCNs from telecommunications suppliers and manufacturers of network products that provide more complete facilities for receiving, processing, monitoring, updating, and implementing PCNs. There is a further need for a method, apparatus, and computer-readable medium that improve the efficiency of PCN implementation, and provide timely notification to entities affected by the change.

SUMMARY OF THE INVENTION

The present invention satisfies the needs described above by providing a method, apparatus, and computer-readable medium for administering the implementation of PCNs that includes more complete facilities for receiving, processing, monitoring, updating, and implementing PCNs than provided by previous systems. Moreover, the present invention provides a method, apparatus, and computer-readable medium for implementing PCNs that improves implementation efficiency, provides timely notification to entities affected by the change, and provides automated information, reduces potential safety hazards, and assists company personnel in making decisions regarding implementation of a PCN.

Generally described, the present invention provides a method for implementing a change to telecommunications network elements. According to the method, a PCN is received that identifies the change. The PCN may be received from a supplier or a manufacturer of the network element in an electronic format. The PCN may include data fields containing data that identifies the change, the network element, the reason for the change, the locations of the change, systems affected by the change, old and new product codes, pertinent dates, and other related information. Further, the PCN may include an electronic attachment that describes in detail how the change is to be made.

Once the PCN is received it is added to a searchable database. The PCN is then evaluated to determine if it can be pre-approved or rejected. If the PCN has been pre-approved, a notice of acceptance is sent to the supplier indicating that the PCN has been pre-approved. A technical evaluator is then assigned to review the PCN for additional implementation requirements. Once the technical evaluator makes recommendations, the PCN is approved and scheduled for implementation, placed on hold, or rejected and closed.

If the PCN is approved, internal entities affected by the change are notified with a copy of the PCN. The searchable database may then be utilized to find, track, update, change, print, view, or make recommendations regarding the PCNs. Moreover, information retrieved from the database can help internal personnel make decisions related to supplier and product performance.

The present invention also provides an apparatus and a computer-readable medium for implementing PCNs. Additional details regarding the various embodiments of the present invention will be provided in the detailed description that follows.

DETAILED DESCRIPTION

As described briefly above, the present invention provides a method, apparatus, and computer-readable medium for implementing PCNs. According to one actual embodiment of the present invention, a Intranet Web site is provided by a PCN implementation server computer. A supplier utilizing a supplier computer may submit a PCN to the secure Intranet Web site through a secure mail server for implementation. A PCN may be sent as an attachment to an electronic mail message sent by a supplier or manufacturer of the product.

A supplier creates the PCN in a predefined format determined by industry standards. This format ensures that all necessary information concerning the product and the change is consistently sent with the PCN. For instance, a supplier may submit an electronic mail message with an attached PCN to change, modify, or repair fiber optic units within the telecommunications network. Once the PCN is received, a determination is made as to whether the PCN meets certain administrative implementation requirements. Administrative implementation requirements may include preliminary checks to ensure that the PCN data fields are correctly formatted and completed, the PCN has the proper classification, and any errors in the PCN are corrected. If the PCN is not submitted in the proper format, an error message is generated. When it has been determined that the implementation requirements are satisfied, the PCN is pre-approved, uploaded into the PCN database, and notification is sent to a technical evaluator. Also, when the PCN is pre-approved an acceptance confirmation is generated to the supplier of the PCN.

A technical evaluator then evaluates the PCN for compatibility with the telecommunications network, interchangeability with other similar products, product deficiency correction, or product enhancement. The technical evaluator provides a technical recommendation regarding the PCN. Then the PCN Coordinator reviews the recommendation and either approves the PCN and sends it to in-progress status, rejects the PCN, or places the PCN on hold. The supplier is then notified of the approval or rejection of the PCN.

If the PCN is approved for implementation, entities connected with the telecommunications network and affected by the PCN are electronically notified of the change along with a copy of the PCN. The in-progress PCN may then be viewed, monitored, and updated until the change identified by the PCN has been completed. Additional details regarding data fields contained within a PCN, the method of implementing changes identified by PCNs, and the format and operation of the searchable database that stores PCN data will be described below with reference to FIGS. 3-6. Additional details regarding the PCN implementation server computer will be described below with respect to FIGS. 1 and 2.

Turning now to the figures, in which like numerals represent like elements, one actual embodiment of the present invention will be described. Those skilled in the art should appreciate that the actual embodiment described herein is illustrative and that changes may be made to the embodiment of the present invention described herein without departing from the spirit and scope of the invention.

Figure 1:
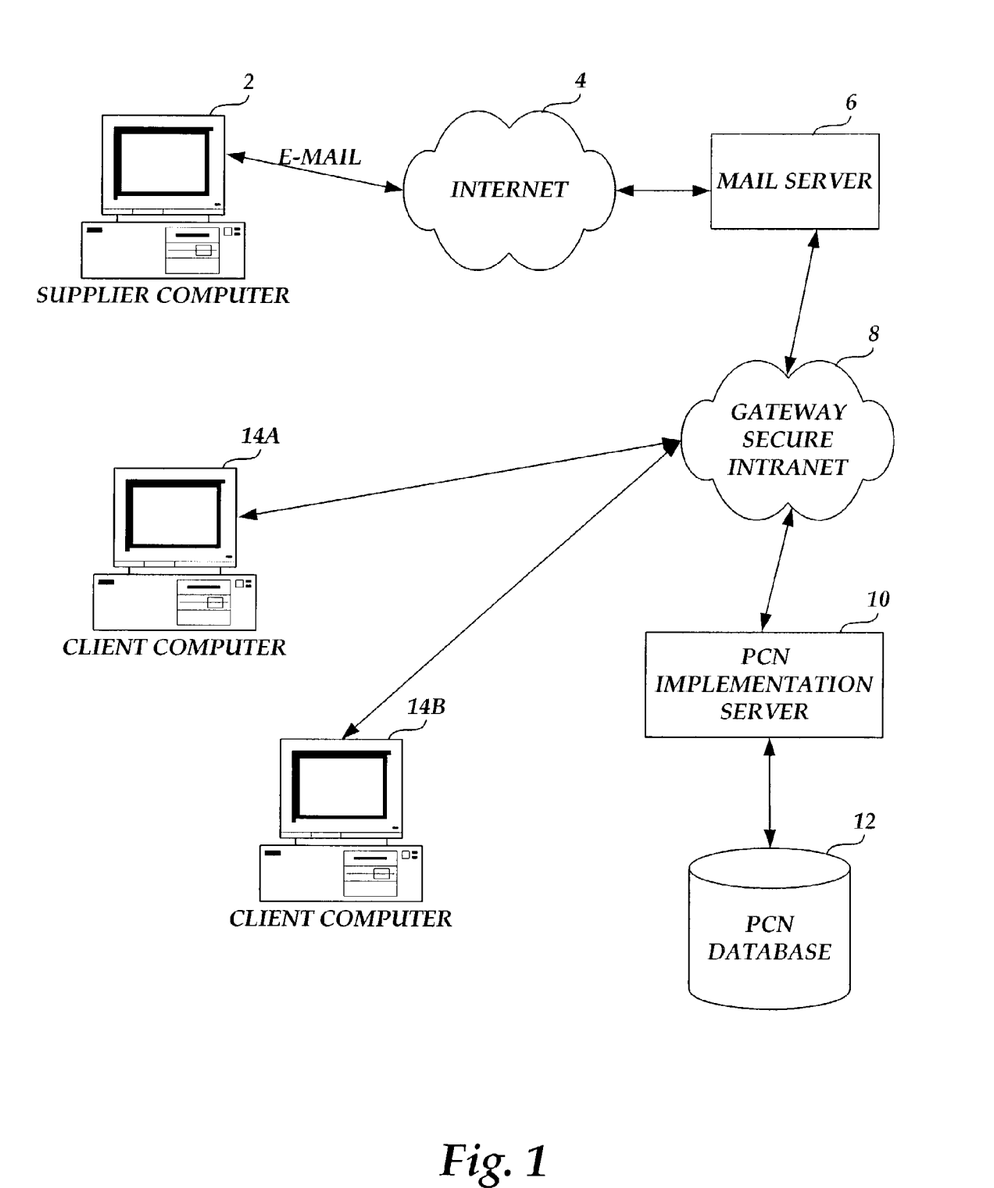
FIG. 1 is a block diagram showing an illustrative system architecture utilized in an actual embodiment of the present invention.

Referring now to FIG. 1, an illustrative system architecture utilized in an actual embodiment of the present invention will be described. As shown in FIG. 1, a supplier computer 2 is provided that connects to the Internet 4. According to the actual embodiment described herein, the supplier computer 2 comprises a standard personal computer connected to the Internet 4 and capable of sending an electronic mail message through the Internet 4 to the mail server computer 6. The mail server computer 6 comprises a standard server computer capable of receiving electronic mail messages using standard protocols such as POP or SMTP. For instance, the supplier computer 2 provides a pre-defined formatted PCN template that suppliers may process and electronically submit as an attachment to an electronic mail (e-mail) message.

The mail server computer 6 transmits the PCN and any attachments through a gateway secure intranet 8 to a PCN implementation server 10. The PCN implementation server 10 transmits data to the PCN database 12. PCN data fields and files attached to the PCN are stored in the PCN database 12. The PCN implementation server 10 sends acceptance and approval confirmations to the supplier computer 2 through the gateway secure intranet 8, the mail server 6, and the Internet 4. The confirmations may be sent as electronic mail messages or other types of messages.

The client computers 14A and 14B represent any Web browser equipped computer authorized to access the company PCN implementation server 10 through the gateway secure intranet 8. Client computers 14A and 14B are capable of executing a standard Web browser application program such as INTERNET EXPLORER from MICROSOFT CORPORATION of Redmond, Wash. The Web browser application program may be utilized to browse a Web site provided by the PCN implementation server 10.

Personnel may utilize the PCN implementation server 10 and database 12 for searching, monitoring, updating, evaluating, and creating PCNs. For instance, authorized personnel may determine whether a PCN has been applied to a certain location in the telecommunications network, by conducting a search of the PCN database 12 using a network client computer such as 14A or 14B to view the current status of the PCN. PCNs are updated to display the Common Language Location Identifiers (CLLIs) that have had the PCN applied.

It should be appreciated that the client computers 14A and 14B may comprise not only local personal computers, but also remote computers connected through a WAN, or mobile computers connected through a dial-up connection. Authorized users of the PCN database 12 may use the client computers 14A-B to access various database features depending on the individual user's access rights. Additional details regarding the PCN implementation server 10 and the PCN database 12 will be provided below.

Figure 2:
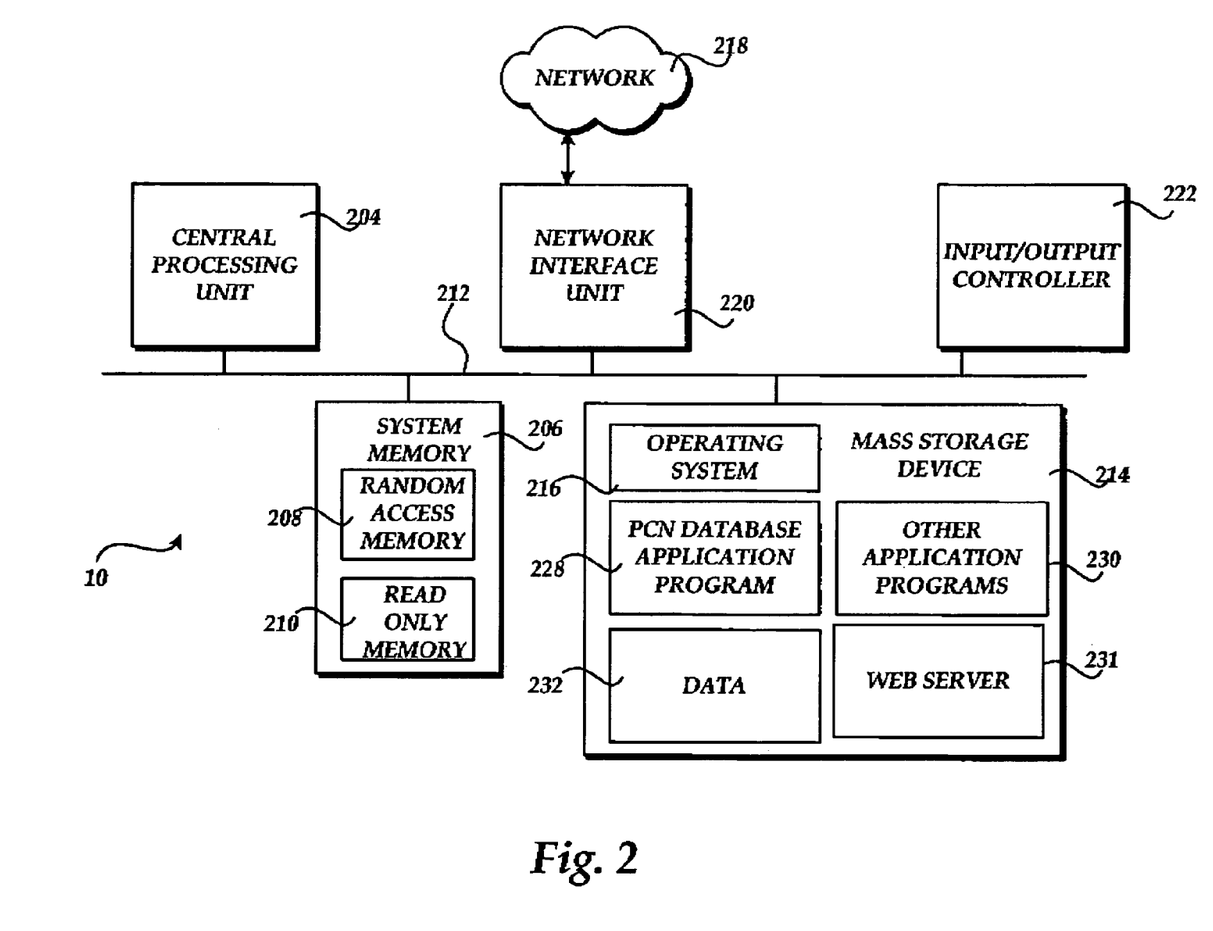
FIG. 2 is a block diagram showing a computer architecture for a PCN implementation server computer utilized in an actual embodiment of the present invention.

Turning now to FIG. 2, an illustrative computer architecture for a PCN implementation server 10 for practicing the various embodiments of the invention will be described. The computer architecture shown in FIG. 2 illustrates a conventional server computer, including a central processing unit 204 ("CPU"), a system memory 206, including a random access memory 208 ("RAM") and a read-only memory ("ROM") 210, and a system bus 212 that couples the memory to the CPU 204. A basic input/output system containing the basic routines that help to transfer information between elements within the computer, such as during startup, is stored in the ROM 210. The PCN implementation server 10 further includes a mass storage device 214 for storing an operating system 216, application programs, such as the PCN database application program 228, and data 232.

The mass storage device 214 is connected to the CPU 204 through a mass storage controller (not shown) connected to the bus 212. The mass storage device 214 and its associated computer-readable media, provide non-volatile storage for the PCN implementation server 10. Although the description of computer-readable media contained herein refers to a mass storage device, such as a hard disk or CD-ROM drive, it should be appreciated by those skilled in the art that computer-readable media can be any available media that can be accessed by the PCN implementation server 10.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the PCN server 10 operates in a networked environment using logical connections to remote computers through a network 218, such as the Internet or Intranet. The PCN implementation server 10 may connect to the network 218 through a network interface unit 220 connected to the bus 212. It should be appreciated that the network interface unit 220 may also be utilized to connect to other types of networks and remote computer systems. The PCN implementation server 10 may also include an input/output controller 222 for receiving and processing input from a number of devices, including a keyboard, mouse, or electronic stylus (not shown in FIG. 2). Similarly, an input/output controller 222 may provide output to a display screen, a printer, or other type of output device.

As mentioned briefly above, a number of program modules and data files may be stored in the mass storage device 214 and RAM 208 of the PCN implementation server 10, including an operating system 216 suitable for controlling the operation of a networked server computer, such as the WINDOWS XP operating system from MICROSOFT CORPORATION of Redmond, Wash. or the SOLARIS operating system from SUN MICROSYSTEMS INC of Santa Clara, Calif. The mass storage device 214 and RAM 208 may also store one or more application programs. In particular, the mass storage device 214 and RAM 208 may store a database application program 228 for creating and editing electronic data 232 from a PCN. Although the embodiments of the invention described herein are described in the context of a database application program 228, the embodiments of the invention may also be used similarly with other application programs for receiving, creating, monitoring, and editing other types of electronic documents. Additional details regarding the operation of the PCN database application program 228 will be described in greater detail below.

Figure 3:
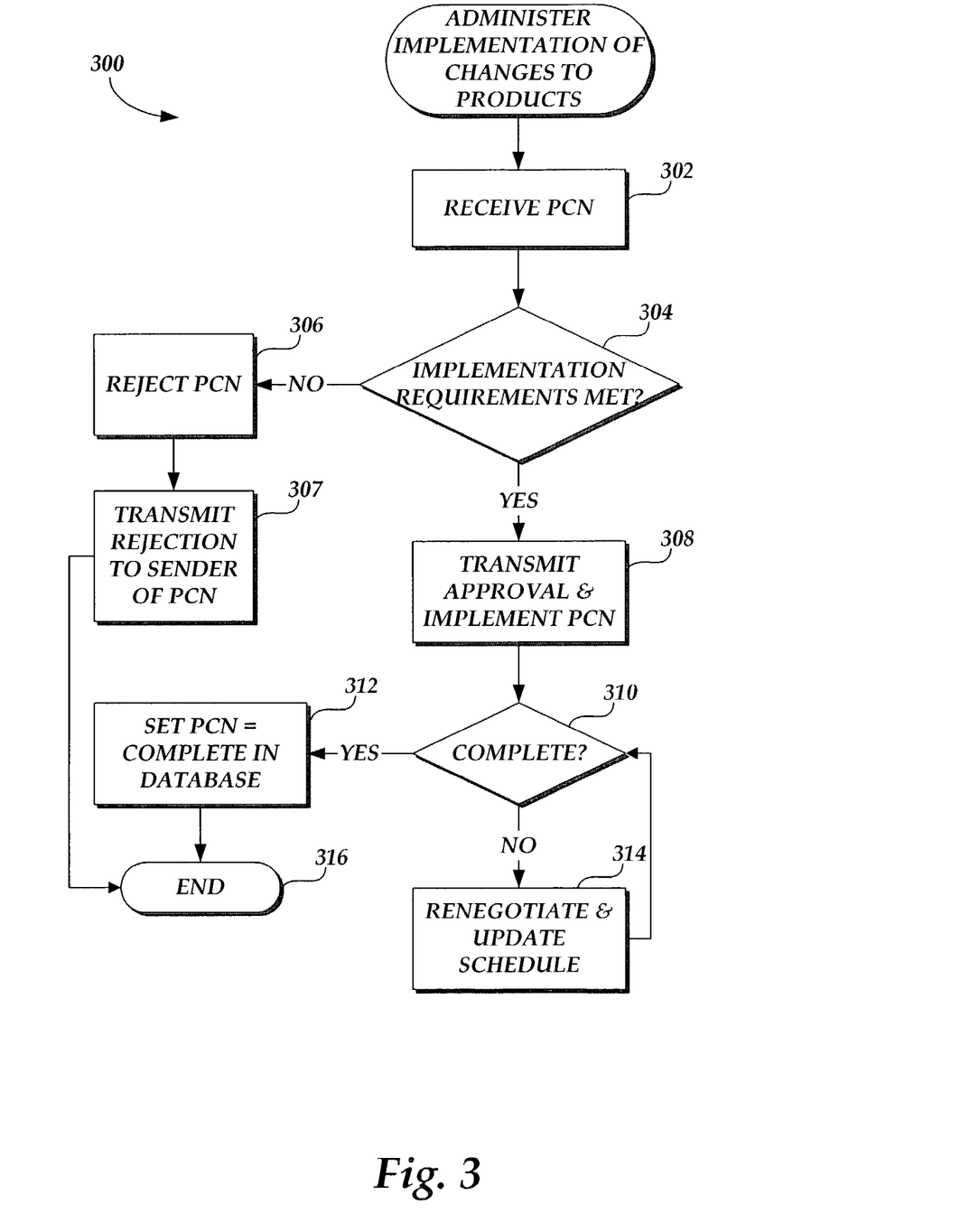
FIG. 3 is a flow diagram showing an illustrative routine for implementing a PCN according to one actual embodiment of the present invention.

Referring now to FIG. 3, a flow diagram will be described that illustrates a routine 300 for administering the implementation of a PCN according to one actual embodiment of the present invention. In particular, the routine 300 illustrates the operation of the PCN implementation server 10 and the PCN database program 228 according to one embodiment. The routine 300 begins at block 302, where a PCN is received that describes a change to a telecommunications network element. The routine 300 continues from block 302 to block 304, where a determination is made as to whether the implementation requirements are satisfied. Implementation requirements may include checks to ensure that data fields are in the proper format and complete, the change product is compatible with the telecommunications network, the PCN corrects a product deficiency, or the PCN enhances the network element. If the implementation requirements are not satisfied, the routine 300 advances to block 306 where the PCN is rejected. Notice of the rejection is transmitted to the sender at block 307. The routine 300 then terminates at block 316. If the implementation requirements are satisfied, the routine 300 continues to block 308.

At block 308, the PCN is approved, notice of approval is transmitted to the sender, specific instructions for implementation are deployed, and entities affected by the change are notified. These notices may be transmitted via electronic mail messages or other means from block 308, the routine 300 advances to blocks 310 and 314 where the PCN is continually monitored for progress and updated until completion. In particular, at block 310 a determination is made as to whether the implementation of the PCN has been completed. If the implementation of the PCN has been completed, the routine 300 advances to block 312 where the PCN is updated in the PCN database 12 and closed before the routine 300 terminates at block 316. If the implementation of the PCN has not been completed, the routine 300 continues to block 314. At block 314, the implementation schedule is reviewed, renegotiated if necessary, and updated. The implementation schedule is a predetermined period of time that has been prescribed for the complete implementation of a PCN. The PCN implementation server 10 may generate report cards on suppliers that evaluate completion of the PCN according to the predetermined schedule. The Routine 300 then branches back to block 310 where another determination is made. Additional details regarding processes provided herein for implementing changes to network elements as defined by a PCN will be described in greater detail below.

Figure 4A:
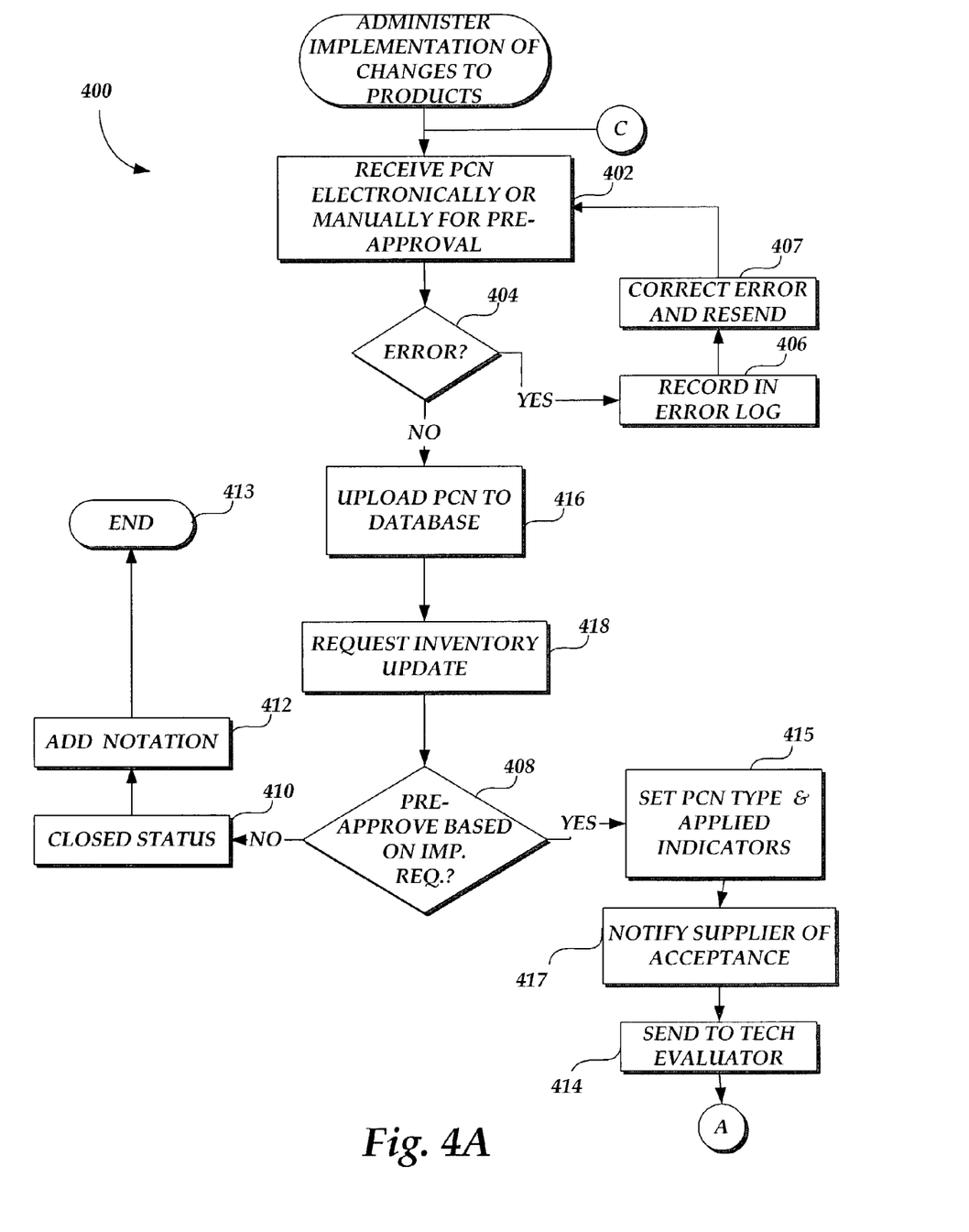
FIGS. 4A-4C are flow diagrams showing an illustrative routine for implementing a PCN according to another actual embodiment of the present invention.
Figure 4B:
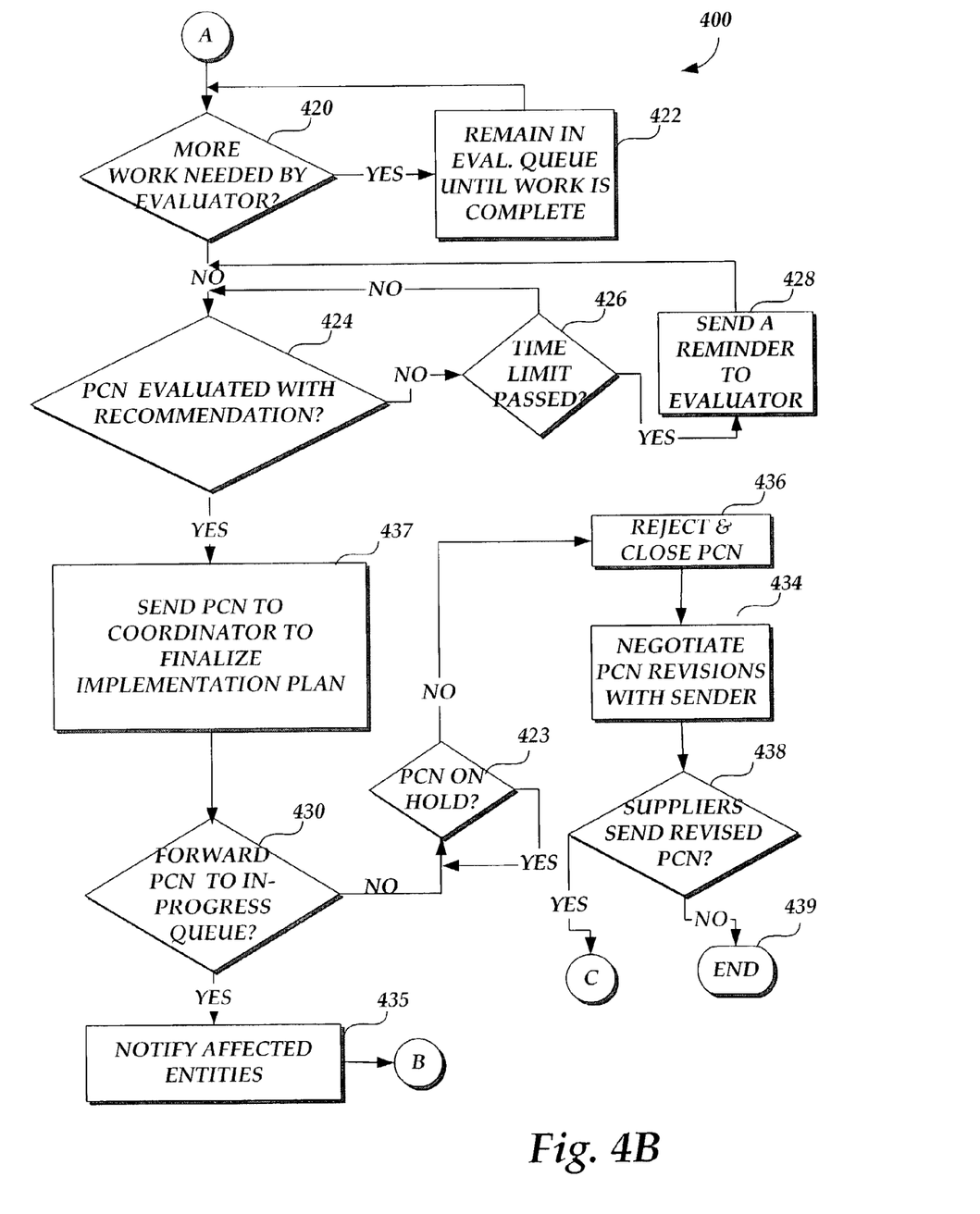
Figure 4C:
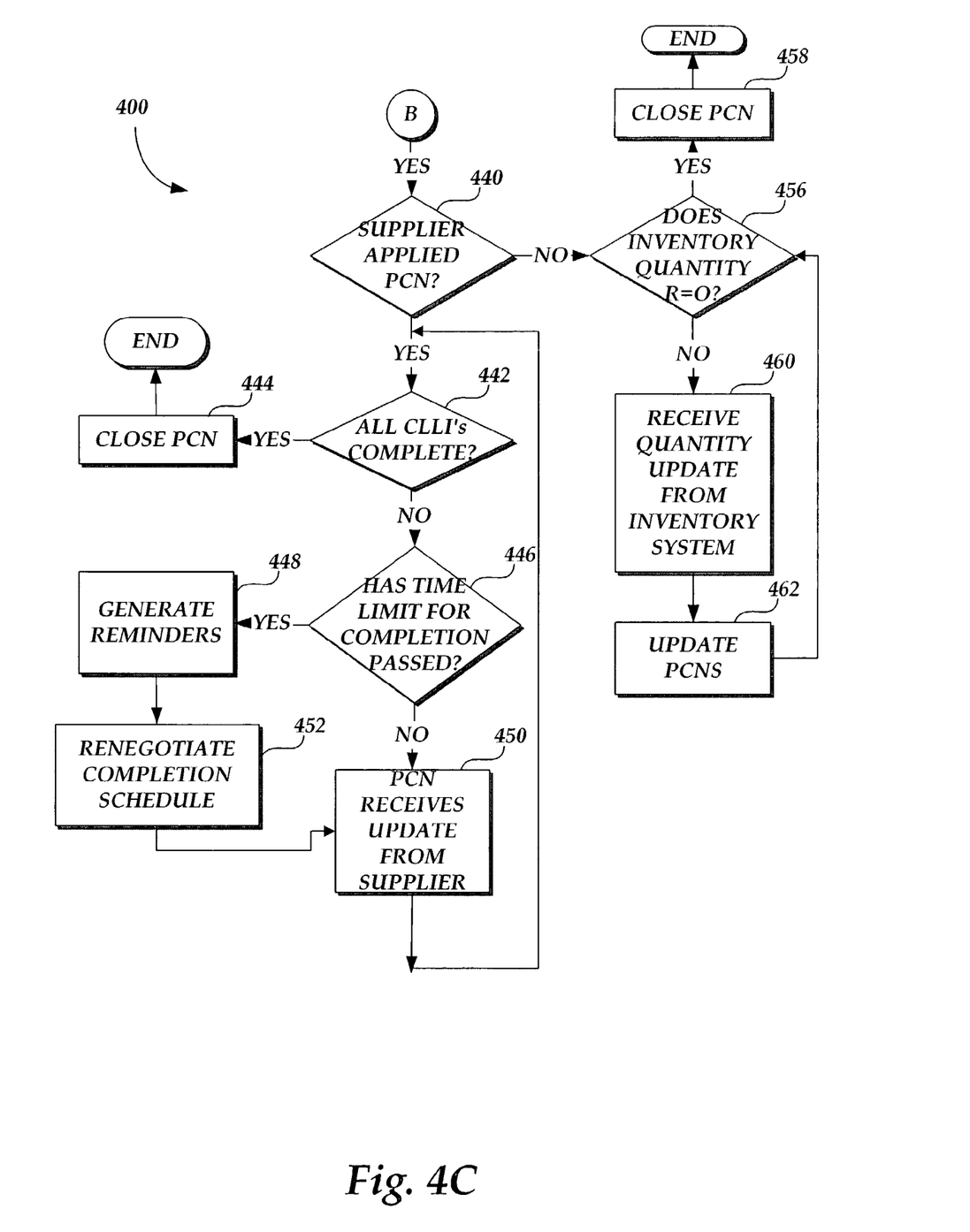

Turning now to FIGS. 4A-C a flow diagram showing an illustrative routine 400 for implementing changes identified in a PCN according to another actual embodiment of the present invention will be described. FIGS. 4A-C illustrate the operation of the PCN implementation server 10 according to another embodiment of the invention. The routine 400 begins at block 402, where a PCN is received either electronically or manually. As describe above, a PCN may be received in the mail server computer 6 as an attachment to an electronic mail message in a predefined format, and is transmitted to the PCN database server computer 10 using the file transfer protocol ("FTP"). Other similar protocols for transferring files may also be utilized. A PCN may also be received in hardcopy form and its contents manually entered into the PCN implementation server 10.

Once the PCN is received by the mail server computer 6, the routine 400 advances to block 404 where a determination is made as to whether the PCN contains any errors. For instance, if a required data field was left blank or had an invalid entry, the routine 400 would advance to block 406 where the PCN would be recorded in an error log. PCNs recorded in the error log are then corrected at block 407 and resubmitted, at block 402. If the PCN does not have any errors, the routine 400 continues to block 416.

At block 416, the PCN is loaded into the PCN implementation server 10. The routine 400 then continues to block 418 where a current status inventory report may be requested to assess the existing quantities of network elements identified in the PCN. A current status inventory report may be uploaded into the PCN implementation server 10 from the company's separate inventory system and is used to assess quantity information regarding the telecommunications network. This feature may be used to help PCN coordinators make pre-approval decisions. Next, the routine 400 continues to block 408 where a determination is made as to whether the PCN has been pre-approved based on the implementation requirements. If the PCN has not been pre-approved, its status is changed to closed at block 410. Following the status change a notation of 'not approved' is added to the PCN at block 412. The routine 400 then terminates at block 413. If the PCN is pre-approved, the routine 400 continues from block 408 to block 415.

At block 415, the PCN product type is identified as a switch or transport products. Switch products are traditionally centralized products that are applied by suppliers if approved. For instance, voice switch, packet switch, and signal transfer are examples of switch products. Transport products are usually remote products that are widely distributed. For instance, digital loop carriers, digital subscriber line (DSL), and add/drop multiplexers are examples of transport products.

At block 415, the identity of the entity that will have responsibility for implementing the change in the PCN is identified. If the supplier of the product will have responsibility for implementing the change the PCN is identified as "vendor applied". If the company has implementation responsibility, the PCN is identified as "telco applied". Next the Routine 400 continues to block 417 where the supplier is notified of the pre-approval and acceptance of the PCN.

From block 417, the routine 400 continues to block 414 where a technical evaluator is selected and required to make recommendations regarding the PCN within a predetermined period of time. The technical evaluator is a person that reviews the pre-approved PCN for compatibility, interchangeability, deficiency correction, or enhancement and that makes recommendations regarding the implementation of the PCN. The routine 400 then proceeds to block 420 where a determination is made as to whether more work or information is needed by the technical evaluator to make a recommendation on the PCN. If more work or information is needed, the routine 400 continues to block 422 where the PCN remains in a queue associated with the technical evaluator. The queue is an assigned holding place for pre-approved PCNs that technical evaluators open to review and make recommendations on assigned PCNs. The routine 400 then branches back to block 420 where another determination is made. If the technical evaluator has the information necessary to make a recommendation on the PCN, the routine 400 continues to block 424.

At block 424, a determination is made as to whether the technical evaluator has made a recommendation on the PCN. If a recommendation has not been made, the routine 400 proceeds to block 426, where a determination is made as to whether the time limit to make a technical recommendation has passed. A time limit may be set by the company at 30 days to review and make recommendations on the PCN. This requirement helps to facilitate timely processing of the PCN. If the time limit has passed the routine 400 continues to block 428 where a reminder is submitted to the technical evaluator as notification of an overdue recommendation. The reminder may be transmitted through e-mail or other electronic means. The routine 400 then branches back to block 424 where another determination is made. If the time limit to make a technical recommendation has not passed, the routine 400 branches back to block 424 for another determination without sending a reminder. If, at block 424, a recommendation has been made, the routine continues to block 437.

At block 437, the PCN is forwarded to a coordinator queue where an implementation schedule for the PCN is finalized. A coordinator queue is an administrative holding place where new, pre-approved, and technical evaluator-approved PCNs await review and disposition by a coordinator with full database access rights. The routine 400 then continues to block 430 where a determination is made as to whether the PCN is ready to be forwarded to an in-progress queue. The in-progress queue is a searchable holding place for approved PCNs that have not had implementation completed. If the PCN has not been forwarded to an in-progress queue the routine 400 continues to block 423 where a determination is made as to whether the PCN is on hold. If the PCN is on hold the routine 400 branches back to block 423 until the coordinator removes the on-hold status. If the PCN is not on hold, the routine 400 continues to block 438 where the coordinator rejects and closes the PCN.

The routine 400 then proceeds to block 434 where the supplier of the PCN is informed of the rejection and necessary revisions to the PCN. The routine 400 then continues to block 438 where a determination is made as to whether the supplier submitted a new and revised PCN. If a new PCN has been submitted the routine 400 branches back to block 402 in FIG. 4A. If a new PCN has not been submitted the routine 400 terminates at block 439. If the PCN has been forward to an in-progress queue, the Routine 400 then continues to block 435.

At block 435, internal entities affected by the PCN are notified of the change along with a copy of the PCN. For instance, affected entities may comprise the product repair group, inventory personnel, or technicians responsible for troubleshooting problems with the telecommunications network. The routine 400 then continues to block 440 where, based on indicators described above, a determination is made as to whether the PCN is vendor applied. If the PCN is not vendor applied, the routine 400 continues to block 456 where a determination is made as to whether the inventory quantity r has been reduced to zero. The inventory quantity represents the number of network elements that remain to be changed according to the PCN. If the inventory quantity equals zero, the routine 400 continues to block 458 where the PCN is closed. If the inventory quantity does not equal zero the routine 400 continues to block 460.

At block 460 the inventory quantity is updated to reflect locations where the change identified by the PCN has been implemented. At block 462, the routine 400 updates the PCN database with the most recent inventory and then branches back to block 456 for another determination. If the PCN is vendor applied, the routine 400 proceeds from block 440 to block 442, where a determination is made as to whether all the PCN locations have been completed within a predetermined period of time. Each PCN location is represented by a Common Language Location Identifier Code (CLLI). A CLLI is an industry code used to identify physical locations and equipment. If all the CLLIs have been completed, the routine 400 proceeds to block 444 where the PCN is closed. The routine 400 then terminates. If the CLLIs have not been completed, the routine 400 continues to block 446.

At block 446, a determination is made as to whether the time limit to complete the vendor applied PCN has passed. If the time limit has passed, the routine 400 continues to block 448 where reminders are generated to those responsible for implementing the changes identified in the PCN. The routine 400 then continues to block 452 where the schedule for completion is renegotiated. The PCN receives an update from the supplier at block 450. This information from the supplier updates the CLLIs that have had the PCN implemented. If the time limit for completing the PCN has not passed, the routine 400 continues directly from block 446 to block 450 and then branches back to block 442 for another determination.

Figure 5A:
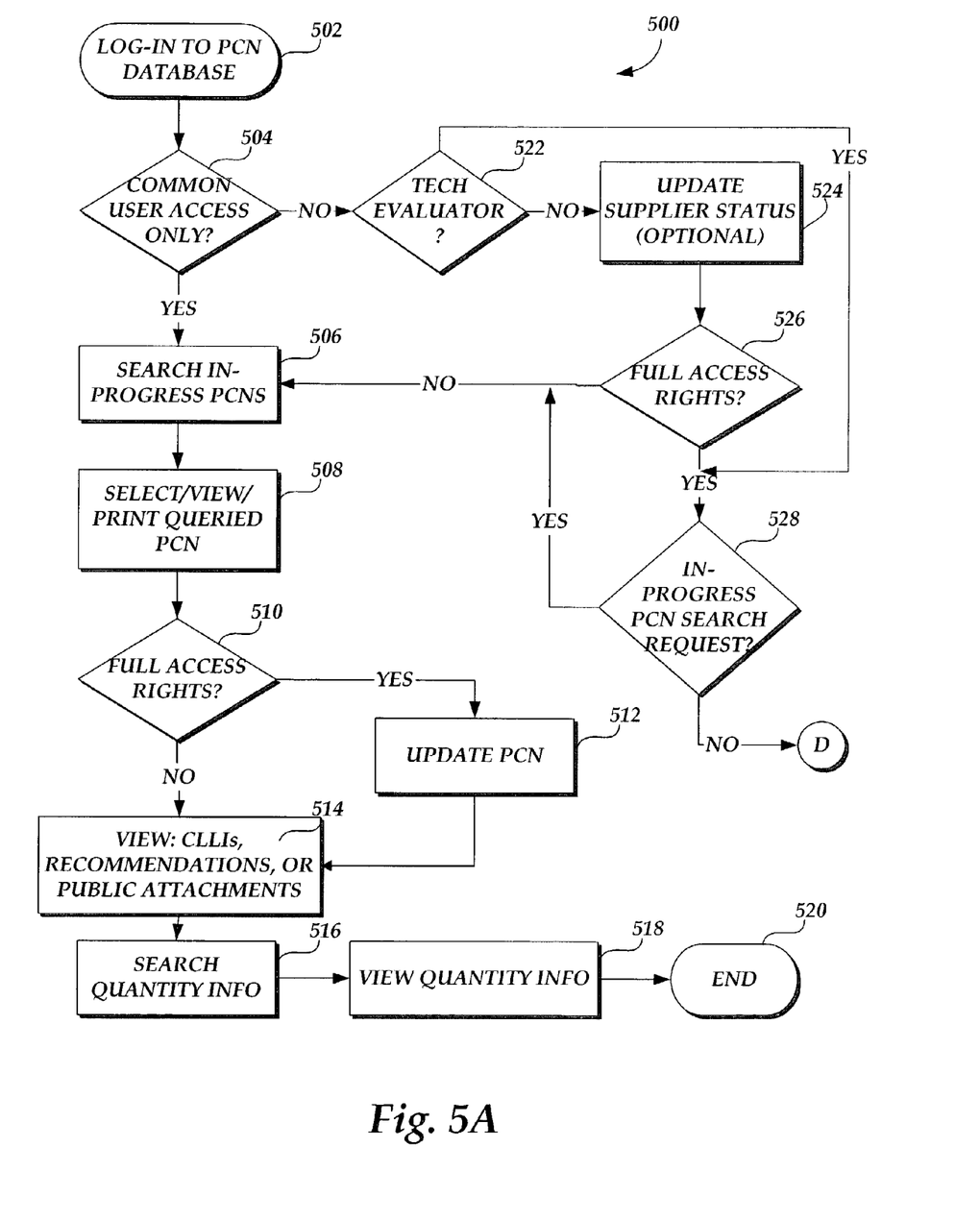
FIGS. 5A-5B is a flow diagram illustrating a routine for interacting with a searchable database provided in an actual embodiment of the present invention.
Figure 5B:
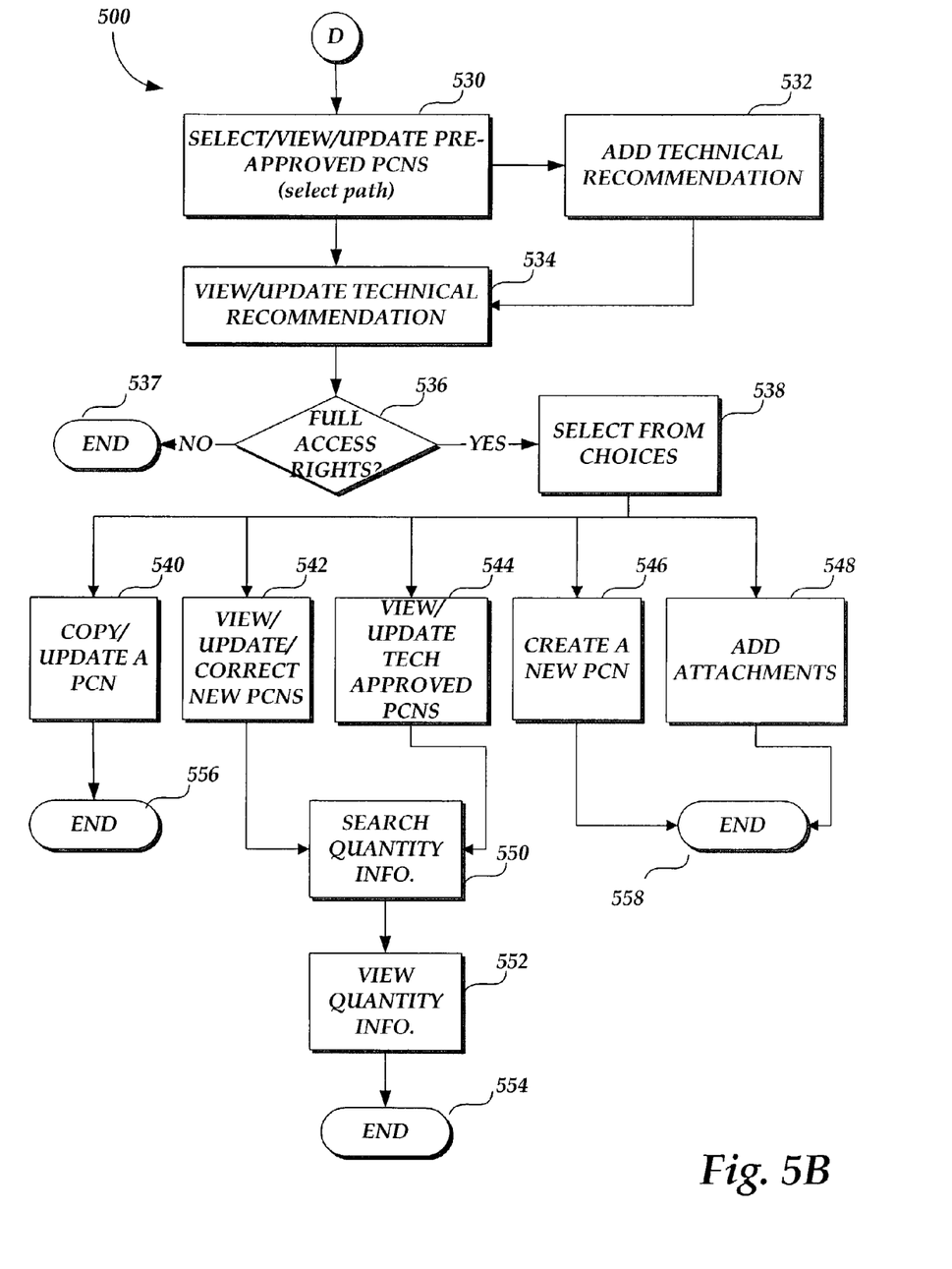

Turning now to FIGS. 5A-5B a flow diagram showing a routine 500 for user interaction with a PCN database provided in an actual embodiment of the present invention will be described. The routine 500 begins at block 502 where a user is prompted to login to the database with a user ID and password. As described above, authorized company personnel have access to the database to determine the current status of certain PCNs. This information may be used for troubleshooting as well as implementation planning.

The routine 500 then continues from block 502 to block 504, where the user's access rights are determined. A user is authorized to use various features of the PCN implementation server 10 based on his/her access rights. For instance, a common user is authorized to search in-progress PCNs and quantity information, whereas technical evaluators, in addition to search access rights, may also add recommendations to pre-approved PCNs. If a user only has common user access rights, the routine 500 continues from block 504 to block 506 where a search based on the user's query is conducted among the in-progress PCNs. Once PCNs that satisfy the query requirements are found, the Routine 500 moves on to block 508 where a PCN is selected for viewing and printing if desired.

From block 508, the routine 500 continue to block 510, where determination is made as to whether the user has full access rights. If the user has full access rights, the routine 500 continues to block 512 where the PCN may be updated. For instance, the PCN may be updated with notes, additional instructions, or schedule revisions. If the user does not have full access rights, the routine 500 continues to block 514 where the user may view CLLIs, recommendations, or public attachments. The routine 500 then continues to block 516 where the user may search quantity information and then view the results in block 518. The routine 500 then exits the database at block 520.

If, at block 504, a determination is made that the user has access rights beyond the common user, the routine 504 continues to block 522 where additional authorization queries are conducted. If, at block 522, a determination is made that the user is not a technical evaluator, the routine 500 continues to block 524 where the application may permit the user to update supplier status. The use of this feature is at the discretion of the individual company. Next, the routine 500 continues to block 526 where another authorization determination is made. If the user has full access rights, the routine 500 continues to block 528 to determine if an in-progress search has been requested. Also, if at block 522 a determination is made that the user is a technical evaluator, the routine 500 continues to block 528.

If at block 528, a search request has been made, the routine 500 continues to block 506 as described above. However, if an in-progress search has not been requested, the routine 500 continues to block 530 where the user may select, view, and updated pre-approved PCNs. Here, the user may either continue to block 532 and add a new technical recommendation before moving to block 534, or proceed directly to block 534 from block 530 and view or update an existing recommendation. The routine 500 may then continue to block 536 where another authorization determination is made.

If at block 536, it is determined that the user does not have full access authorization, the routine 500 may end at block 537. If the user does have full access authorization, the routine 500 continues to block 538 where a choice is made as to what task the user desires to complete. From block 538, the routine 500 continues to block 540 where the user may copy and update a PCN then end at block 556. Further, the routine 500 may continue to block 546 where a PCN may be created or continue to block 548 where an attachment may be added to the PCN then end at block 558.

The routine 500 may also continue to blocks 542 or 544 where the user may view and update new PCNs or technical evaluator-approved PCNs, respectively. Either path then continues to block 550 where quantity information may be searched. Next, the routine 500 continues to block 552 where the queried quantity information may be viewed before the routine 500 ends at block 554. The database information may be searched and evaluated for business decisions. For instance, company personnel may use database information to determine how long it takes a supplier to complete a PCN, and based on the data award future business.

Figure 6A:
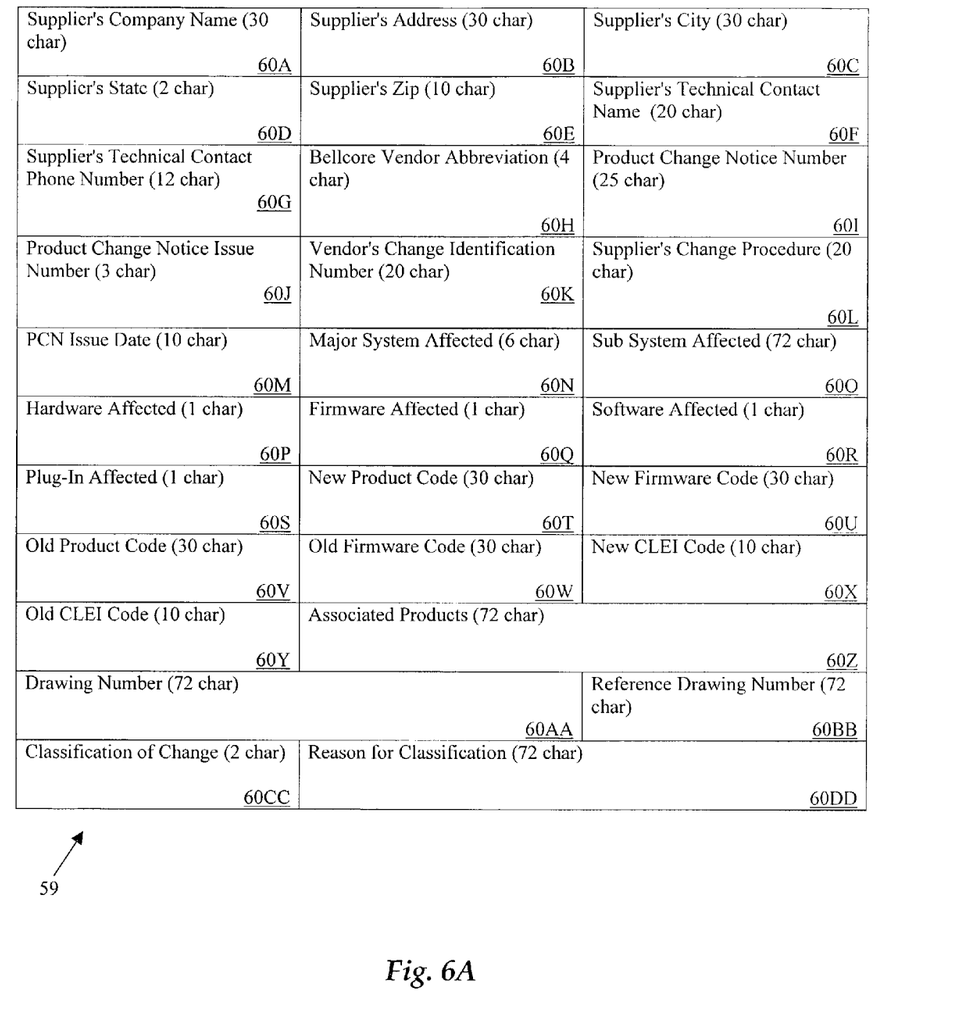
FIGS. 6A-6B are database diagrams showing an illustrative product change notice database record utilized in an actual embodiment of the present invention.
Figure 6B:
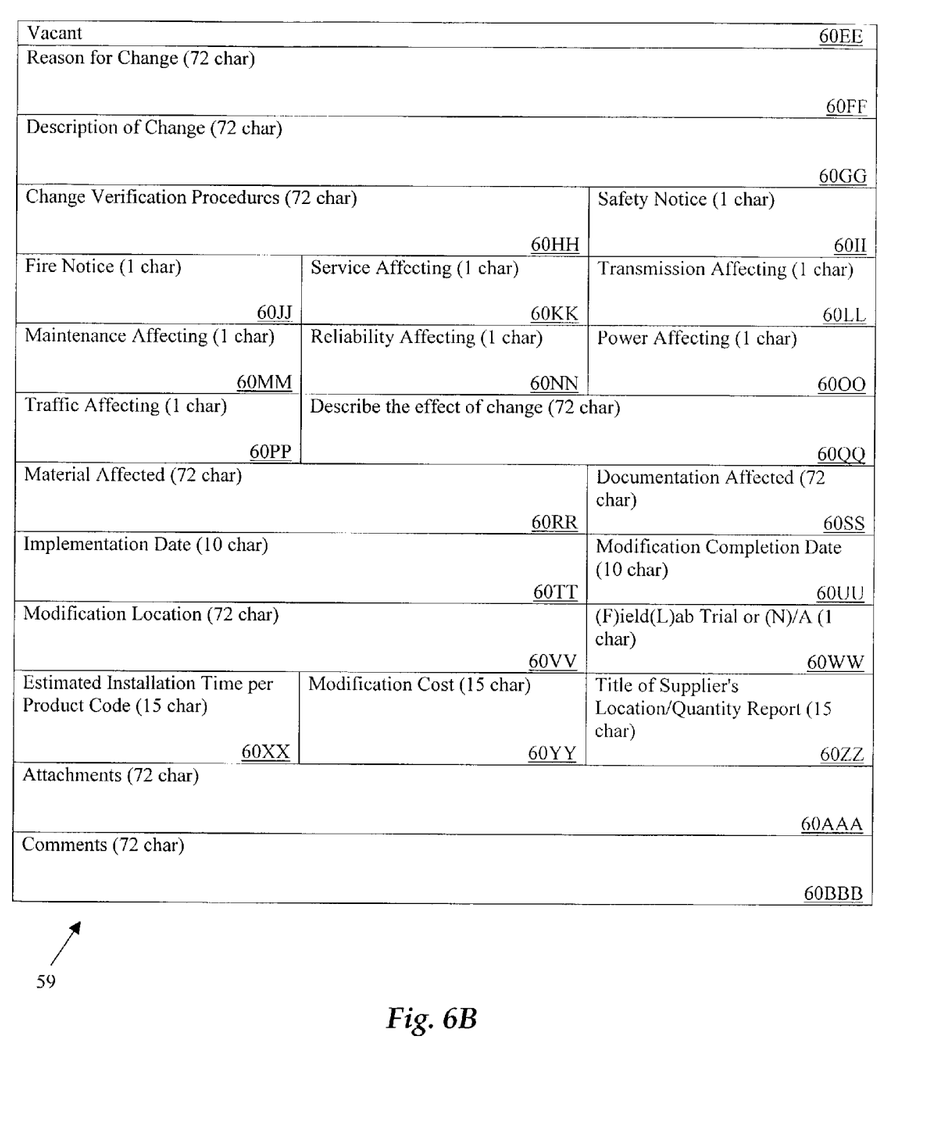

Turning now to FIGS. 6A-6B a database diagram showing an illustrative product change notice database record 59 utilized in an actual embodiment of the present invention will be describe. The database record 59 contains all of the data contained in a PCN and is stored in the PCN database 12. Data fields 60A-60G contain text regarding the supplier's contact information with character field limits displayed. Data fields 60H-60M contain header information to assist the company with identifying the PCN. Data fields 60N-60S and 60II-60SS contain information that identifies the equipment, software, firmware, systems, materials, and operating entities affected by the PCN. This information may be used to help determine which telecommunications entities are affected by the PCN and how each entity may be impacted. Further, data fields 60T-60Y contain old and new identification codes to assist with equipment identification, inventory updates, and location identification.

Data field 60CC contains information regarding the classification of the PCN. The classification of a PCN is based on the fundamental motivation for the PCN and industry standards. For instance, if a PCN is submitted to correct a network element deficiency it may receive a higher classification than if it is merely an enhancement or a minor change that does not affect the existing functionality of a network element.

Further, data fields 60Z-60BB, 60DD, 60FF-60HH, 60QQ-60SS, 60VV, 60AAA, and 60BBB are unlimited text fields that contain more detailed information concerning the PCN. These fields include information regarding the following: network elements associated with the PCN, PCN drawing and reference numbers, change verification procedures, modification locations, materials and documentation affected by the change, and attachments to the PCN. The unlimited text fields also contain comments about the PCN, a detailed description of the PCN, and reasons why the PCN has been requested and classified in a certain class. Attachments may contain detailed method of procedures to explain how to implement the change identified in the PCN.

Data fields 60TT, 60UU, and 60WW-60ZZ contain information regarding the following: implementation and completion dates of the PCN, whether a field or lab trial is will be conducted, estimated installation time, modification cost, and the title of the supplier's location/quantity report.

Based on the foregoing, it should be appreciated that the present invention provides a method, apparatus, and computer-readable medium for implementing PCNs. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for implementing a change to one or more products, comprising:
   receiving a product change notice identifying the change;
   determining whether the product change notice satisfies one or more implementation requirements;
   in response to determining that the product change notice satisfies the one or more implementation requirements, implementing the change identified by the product change notice in the one or more products;
   applying a Common Language Location Identifier to the product change notice; and updating the product change notice to display the Common Language Location Identifiers, wherein the Common Language Location Identifiers identifies the one or more products and a location of the one or more products that have had the product change notice applied.

2. The method of claim 1, further comprising:
   determining whether implementation of the change has been completed; and
   in response to determining that implementation has been completed, changing a status of the product change notice to completed.

3. The method of claim 2, wherein determining whether implementation of the change has been completed comprises:
   determining whether implementation has been completed according to a schedule; and
   negotiating an extension to the schedule in response to determining that implementation has not been completed according to the schedule.

4. The method of claim 1, wherein the products comprise one or more network elements utilized within a telecommunications network.

5. The method of claim 3, wherein the product change notice further comprises one or more data fields containing data identifying the one or more products, identifying the change, and identifying a classification for the product change notice.

6. The method of claim 5, wherein the product change notice is received in an electronic format.

7. The method of claim 6, wherein implementing comprises:
   adding the product change notice to a searchable database;
   generating an acceptance receipt to a sender of the product change notice; and
   selecting a technical evaluator to review the product change notice for compliance with the one or more implementation requirements.

8. The method of claim 7, further comprising providing an interface to the searchable database, accessible to one or more client computers.

9. The method of claim 5, wherein one of the implementation requirements comprises a requirement that each of the one or more fields contain valid data.

10. The method of claim 7, wherein one of the implementation requirements comprises a requirement that the one or more products remain compatible with a telecommunications network following application of the change to the products.

11. The method of claim 7, wherein one of the implementation requirements comprises a requirement that the one or more products remain interchangeable with other similar products in a telecommunications network following application of the change to the products.

12. The method of claim 7, wherein one of the implementation requirements comprises a requirement that the one or more deficiencies within the products are corrected by application of the change to the products.

13. The method of claim 7, wherein one of the implementation requirements comprises a requirement that one or more product features are enhanced following application of the change to the products.

14. The method of claim 7, further comprising rejecting the product change notice in response to determining that the product change notification does not satisfy the one or more implementation requirements.

15. The method of claim 7, further comprising determining whether the determination regarding whether the product change notice satisfies the one or more implementation requirements has occurred within a predetermined period of time; and sending one or more reminder notifications to the technical evaluator in response to determining that it has not occurred within the predetermined period of time.

16. The method of claim 7, wherein implementing the change identified by the product change notice comprises placing the product change notice in a coordinator work queue, generating an implementation plan for the change identified by the product change notice, and notifying one or more entities affected by the product change notice.

17. The method of claim 16, further comprising:

determining whether implementation of the change is progressing according to the schedule; and in response to determining that implementation of the change is progressing according to the implementation plan, updating an in-progress status of the product change notice in the searchable database to reflect the progress.

18. The method of claim 17, wherein determining whether implementation of the change is progressing according to the implementation plan, further comprises receiving updates from an inventory system to identify the products to which the change has been applied and comprising the updates to the plan.

19. The method of claim 17, further comprising generating one or more reminder notifications to one or more personnel implementing the product change notification in response to determining that implementation of the change is not progressing according to the schedule.

20. A method for implementing a change to one or more network elements within a communications network, comprising:

receiving an electronic product change notice comprising one or more data fields containing data identifying the change and network elements;

adding the product change notice to a searchable database; generating an acceptance receipt to a sender of the product change notice;

determining whether the product change notice satisfies one or more implementation requirements;

in response to determining that the product change notice satisfies the one or more implementation requirements, implementing the change identified by the product change notice in the network elements;

in response to determining that the product change notice does not satisfy the one or more implementation requirements, rejecting the change identified by the product change notice in the one or more network elements;

determining whether implementation of the change is progressing according to a schedule;

in response to determining that implementation of the change is progressing according to the schedule, updating an in-progress status of the product change notice in the database to reflect the progress;

in response to determining that implementation of the change is not progressing according to the schedule, generating a reminder notification to one or more entities affected by the product change notice;

receiving one or more updates from an inventory system identifying the products to which the change has been applied;

applying a Common Language Location Identifier to the product change notice;

updating the product change notice to display the Common Language Location Identifiers, wherein the Common Language Location Identifiers identify a location and one or more products that have had the product change notice applied;

determining whether implementation has been completed according to a schedule; and negotiating an extension to the schedule in response to determining that implementation has not been completed according to the schedule.

21. The method of claim 20, wherein determining whether implementation is progressing according to a schedule comprises accepting an electronic status report from one or more suppliers into the searchable database.

22. The method of claim 21, further comprising updating one or more common language location identifier codes in the searchable database for one or more locations where the network elements are physically located.

23. The method of claim 22, further comprising:

providing a facility to provide feedback on one or more implementing entities; and based on the feedback, awarding future business.

24. The method of claim 22, wherein one or more users of the searchable database may view and update the database based on an assigned level, the assigned level granting one or more varied access rights.

25. The method of claim 22, further comprising determining whether the product change notice relates to a transport portion of the communications network or a switch portion of the communications network.

26. The method of claim 21, wherein the electronic status report is transmitted in a pre-defined format.

27. The method of claim 22, wherein the searchable database further comprises data indicating whether the product change notice is being completed by the supplier of the network elements or one or more entities of the communications network.

28. The method of claim 22, wherein the product change notice further comprises an attachment that describes how a change is to be made.

* * * * *